United States Patent [19]

Yoshida et al.

[11] Patent Number: 4,842,743
[45] Date of Patent: Jun. 27, 1989

[54] METHOD OF REMOVING SOLVENT FROM CHLORINATED RESIN

[75] Inventors: Kageo Yoshida; Osamu Nittani; Toshinobu Ito; Makoto Kokura; Kouzi Hirano, all of Tokyo, Japan

[73] Assignee: Asahi Denka Kogyo K.K., Tokyo, Japan

[21] Appl. No.: 168,646

[22] Filed: Mar. 16, 1988

[30] Foreign Application Priority Data

Mar. 27, 1987 [JP] Japan ................................ 62-73445
Jul. 31, 1987 [JP] Japan ............................... 62-192195

[51] Int. Cl.$^4$ ............................................. B01D 11/04
[52] U.S. Cl. ......................................... 210/634; 203/49; 210/918
[58] Field of Search ............... 210/633, 634, 673, 269, 210/918, 511; 203/49; 525/356, 332.3, 359.1

[56] References Cited

U.S. PATENT DOCUMENTS 4,061,566 12/1977 Modell .............................. 210/673

Primary Examiner—Frank Spear
Attorney, Agent, or Firm—Flynn, Thiel, Boutell & Tanis

[57] ABSTRACT

A solvent remaining in a chlorinated resin can be removed away be bringing the solvent into contact with a fluid carbon dioxide being in a supercritical or liquid state.

3 Claims, 1 Drawing Sheet

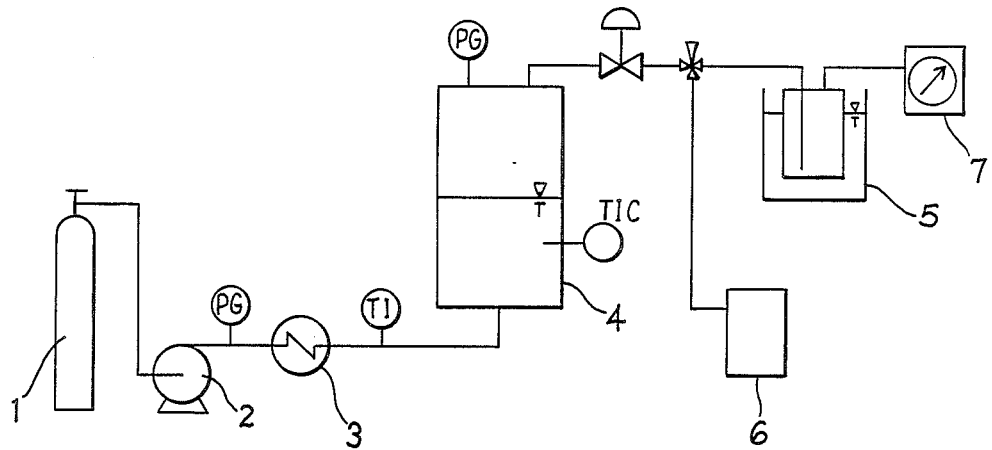

METHOD OF REMOVING SOLVENT FROM CHLORINATED RESIN

This invention relates to a method of removing a solvent remaining in a chlorinated resin. More particularly, the present invention is concerned with a method of removing a solvent remaining in a chlorinated resin by supercritical extraction or solid-liquid extraction techniques.

STATEMENT OF THE PRIOR ARTS

A chlorinated resin obtained by chlorinating a hydrocarbon resin is widely used to prepare a paint, an ink, an adhesive, etc. Since the chlorinated resin is produced by chlorinating a hydrocarbon resin in a solvent, the solvent tends to remain in the formed chlorinated resin. Therefore, there has been a need to remove such solvent.

A conventional method of removing the solvent generally comprises heating the chlorinated resin to thereby evaporate the solvent present in the resin. In this method, it is difficult to decrease the solvent content below 1%. Further, this method has a drawback in that heating causes degradation of the resin, thereby giving a product of poor quality. Moreover, a good deal of energy is necessary for heating. Therefore, this conventional method leaves much room for improvement.

In order to obviate the above drawbacks, Japanese Patent Publication No. 24801/1985 proposed a method of removing a solvent which comprises conducting infrared heating in combination with hot water or hot air heating. This method is the same as the above method in respect of heating and is not satisfactory from the viewpoints of product degradation and efficiency.

Meanwhile, it is known that a fluid in a supercritical state is capable of dissolving a wide variety of materials therein. The supercritical extraction technique based on this knowledge has been studied mainly for use in the field of extraction of components from drugs, foods, cosmetics, etc.

BRIEF DESCRIPTION OF DRAWING

FIG. 1 is a flow chart illustrating the steps of the solvent removal method according to the present invention wherein the folowing numerals represent the corresponding pieces of equipment.
1. . .cylinder
2. . .pump
3. . .preheating device
4. . .extraction tank
5. . .trap
6. . .gas chromatograph
7. . .gas meter

SUMMARY OF THE INVENTION

The present invention relates to a method of eliminating the above-mentioned problems by applying the supercritical extraction technique and solid-liquid extraction technique to solvent removal from a chlorinated resin.

That is, the method of removing a solvent from a chlorinated resin, according to the present invention, is characterized in that the solvent is brought into contact with a fluid carbon dioxide in a supercritical or liquid state.

Examples of the chlorinated resins for use in the present invention include chlorinated polyolefins and rubbers obtained by chlorinating a polyolefin, such as polyethylene, polypropylene, and polyethylene-polypropylene copolymer, natural rubber, synthetic rubber, polyisoprene, polybutadiene, ethylenevinyl acetate copolymer, and mixtures thereof. The degree of chlorination of these polymers may be low or high. The chlorinated resin may contain a plasticizer, a stabilizer, and other auxiliaries. The effect of solvent removal is remarkable particularly when a chlorinated resin contains a plasticizer in an amount of from 1 to 10% in the present invention.

Examples of the solvents employed in the present invention are chlorinated hydrocarbon solvents to be used in the production of a chlorinated resin, such as carbon tetrachloride, chloroform, methylene chloride, chloroethane, dichloroethane, trichloroethane, tetrachloroethane, and mixtures thereof.

The carbon dioxide to be used in the present invention has a solubility parameter which is close to that of a solvent, such as carbon tetrachloride, and that of chlorinated resins. Further, advantageously, it is non-toxic, non-flammable, and non-combustible. Moreover, the carbon dioxide can be readily separated from the solvent.

Now the present invention will be described with reference to a method in which a chlorinated rubber is employed as a chlorinated resin and carbon tetrachloride is used as a solvent.

FIG. 1 is a flow chart illustrating an embodiment of the present invention. Carbon dioxide in a supercritical or liquid state is fed from a cylinder 1 via a preheater 3 into an extraction tank 4 by means of a pump 2. In the extraction tank 4, a powdery chlorinated rubber from which the solvent is to be removed is accommodated in advance. In the extraction tank 4, the carbon dioxide in a supercritical or liquid state as fed and the powdery chlorinated rubber are mixed together. As a result, the carbon tetrachloride, as the solvent present in the chlorinated rubber, is extracted by the carbon dioxide. The carbon dioxide containing carbon tetrachloride is fed to a trap 5, by which the carbon tetrachloride is recovered, with the carbon dioxide being discharged into the air. The carbon dioxide may be recovered and re-utilized in place of being discharged into the air. Numerals 6 and 7 designate a gas chromatograph and a gas meter, respectively. In this embodiment, the recovery of carbon tetrachloride is conducted by the use of a cooling trap. However, alternatively, the recovery can be conducted by the use of an active carbon column capable of adsorbing carbon tetrachloride therein.

The temperature and pressure for extraction may be widely varied depending on the types of the product and solvent. However, when a supercritical extraction is conducted by making use of carbon dioxide in a supercritical state, it is generally preferred that the temperature range from 30° to 120° C., and the pressure range from 75 to 250 kg/cm$^2$. On the other hand, when a solid-liquid extraction is conducted by making use of carbon dioxide in a liquid state, it is preferred that the temperature range from −40° C. to less than 30° C., and the pressure range from 5 to 250 kg/cm$^2$ According to the present invention, the solvent content of a chlorinated resin can be efficiently reduced without causing degradation due to heating of the resin, thereby obtaining a high-quality chlorinated resin.

EXAMPLES

The present invention will now be described in more detail with reference to the following Examples which should not be construed to be limiting the scope of the present invention.

EXAMPLE 1

(Chlorinated Rubber)

1 kg of polyisoprene rubber (average molecular weight: $840 \times 10^3$) was dissolved in 25 kg of carbon tetrachloride and subjected to molecular weight regulation treatment with air. Then, the solution was heated to 70° C., and the oxygen dissolved in the solution was purged with a nitrogen gas. 5 g of azobisisobutyronitrile as a chlorinating catalyst was added to the solution and the solution was well agitated. Next, a chlorine gas was introduced into the mixture for 12 hr, thereby obtaining a chlorinated polyisoprene having a chlorine content of 66%. The reaction mixture was slowly put in hot water while vigorously stirring, thereby obtaining white powder. The white powder thus obtained was dehydrated by centrifugation and dried at 60° C. for 24 hr, thereby obtaining a chlorinated polyisoprene containing 8.0% of carbon tetrachloride.

50 g of this chlorinated rubber was put into an extraction tank, and carbon dioxide in a supercritical state was introduced thereinto under the conditions of temperature, pressure, flow rate, and time as shown in Table 1. The carbon tetrachloride (hereinafter referred to as "CTC") content of the chlorinated rubber after the supercritical extraction is shown in Table 1 (see ①-⑤ and ⑦-⑮ of Table 1).

EXAMPLE 2

(Chlorinated Polyethylene)

The same procedures as those of Example 1 were repeated, except that polyethylene wax (average molecular weight: 5000) was used as the starting material, thereby obtaining chlorinated polyethylene having a chlorine content of 67% and containing 6.5% of carbon tetrachloride. The CTC content of the chlorinated polyethylene after the supercritical extraction conducted under the same conditions as those of Example 1 is shown in Table 1 (see ⑥ and 16 of Table 1).

TABLE 1

| | pressure kg/cm² | temperature °C. | flow rate l/min | time Hr | CTC % |
|---|---|---|---|---|---|
| ① | 100 | 30 | 5 | 1.5 | 0.30 |
| ② | 80 | 30 | 0.5 | 5 | >0.10 |
| ③ | 75 | 30 | 5 | 5 | >0.10 |
| ④ | 80 | 40 | 0.5 | 2.25 | 0.30 |
| ⑤ | 80 | 30 | 0.5 | 3 | 0.50 |
| ⑥ | 80 | 30 | 0.5 | 5 | >0.10 |
| ⑦ | 200 | 80 | 0.5 | 0.5 | 0.2 |
| ⑧ | 150 | 80 | 0.5 | 1.0 | >0.1 |
| ⑨ | 150 | 40 | 0.5 | 1.0 | 0.5 |
| ⑩ | 150 | 40 | 5.0 | 0.5 | 0.3 |
| ⑪ | 100 | 80 | 0.5 | 1.0 | >0.1 |
| ⑫ | 100 | 40 | 0.5 | 1.0 | 0.4 |
| ⑬ | 80 | 80 | 0.5 | 1.0 | 0.6 |
| ⑭ | 80 | 80 | 5.0 | 0.5 | 0.2 |
| ⑮ | 80 | 40 | 0.5 | 1.0 | 0.4 |
| ⑯ | 150 | 40 | 0.5 | 1.0 | >0.1 |

The color of the above-mentioned chlorinated rubber before solvent removal was 1 to 2 on the Gardner scale. The color of the chlorinated rubber after the supercritical extraction treatment was also 1 to 2 on the Gardner scale. There was no difference between them.

By contrast, when the solvent removal from the chlorinated rubber was conducted by the heating method, heating at 120° C. for 1 to 2 hr caused the rubber to have a CTC content of 4 to 6% and a Gardner scale color of 4 to 5 when the rubber did not contain any plasticizer and caused the rubber to have a CTC content of 1 to 2% and a Gardner scale color of 7 to 9 when the rubber contained a plasticizer.

With respect to the chlorinated polyethylene as well, the color of the polymer before solvent removal was 1 or less on the Gardner scale, and that of the polymer after supercritical extraction was also 1 or less without any change. By contrast, the polymer after the above-mentioned heating treatment had a CTC content of 2 to 3% and a Gardner scale of 2 to 3.

EXAMPLE 3

(Chlorinated Rubber)

50 g of the chlorinated rubber obtained in Example 1 was put into an extraction tank, and liquid carbon dioxide was introduced thereinto under the conditions of temperature, pressure, flow rate, and time as shown in Table 2. The carbon tetrachloride (CTC) content of the chlorinated rubber after the solid-liquid extraction is shown in Table 2 (①-⑨ Table 2).

EXAMPLE 4

(Chlorinated Polyethylene)

The same procedures as those of Example 3 were repeated, except that polyethylene wax (average molecular weight: 5000) was used as the starting material), thereby obtaining chlorinated polyethylene having a chlorine content of 67% and containing 6.5% of carbon tetrachloride. The CTC content of the chlorinated polyethylene after the solid-liquid extraction conducted under the same conditions as those of Example 3 is shown in Table 2 (see ⑩ of Table 2).

TABLE 2

| | pressure kg/cm² | temperature °C. | flow rate l/min | time Hr | CTC % |
|---|---|---|---|---|---|
| ① | 150 | 20 | 0.5 | 1.0 | 0.3 |
| ② | 150 | 0 | 0.5 | 3.0 | 0.5 |
| ③ | 100 | 20 | 0.5 | 1.0 | 0.5 |
| ④ | 100 | 0 | 5.0 | 3.0 | 0.3 |
| ⑤ | 100 | −10 | 0.5 | 3.0 | 0.3 |
| ⑥ | 50 | 0 | 0.5 | 3.0 | 0.4 |
| ⑦ | 50 | −10 | 0.5 | 3.0 | 0.8 |
| ⑧ | 20 | −10 | 5.0 | 3.0 | 0.8 |
| ⑨ | 100 | 0 | 0.5 | 3.0 | 0.8 |
| ⑩ | 50 | 0 | 0.5 | 1.0 | 0.3 |

The color of the above-mentioned chlorinated rubber before solvent removal was 1 to 2 on the Gardner scale. The color of the chlorinated rubber after the solidliquid extraction with carbon dioxide was also 1 to 2 on the Gardner scale. There was no difference between them.

By contrast, when the solvent removal from the same chlorinated rubber conducted by the heating method, heating at 120° C. for 1 to 2 hr caused the rubber to have a CTC content of 4 to 6% and a Gardner scale of 4 to 5 when the rubber did not contain any plasticizer and caused the rubber to have a CTC content of 1 to 2% and a Gardner scale color of 7 to 9 when the rubber contained a plasticizer.

With respect to the chlorinated polyethylene as well, the color of the polymer before solvent removal was 1 or less on the Gardner scale, and that of the polymer after solid-liquid extraction was also 1 or less without any change. By contrast, the polymer after the above-mentioned heating treatment had a CTC content of 2 to 3% and a Gardner scale of 2 to 3.

According to the present invention, the content of a chlorinated hydrocarbon solvent remaining in a chlorinated resin can be readily reduced to 1% or less, preferably 0.5% or less. The present invention is carried out at low temperatures, so that it does not cause degradation of the chlorinated resin. Therefore, a high-quality chlorinated resin can be produced efficiently.

What is claimed is:

1. In a method for removing an organic solvent impurity contained in a chlorinated polyolefin or a chlorinated rubber, wherein said chlorinated polyolefin or chlorinated rubber also contains a plasticizer in an amount of from 1 to 10%, and said organic solvent was used in the production of said chlorinated polyolefin or said chlorinated rubber, the improvement comprising: contacting said organic solvent impurity-containing chlorinated polyolefin or chlorinated rubber with a fluid carbon dioxide in a supercritical or a liquid state.

2. The method according to claim 1, characterized in that said fluid carbon dioxide is in a supercritical state.

3. The method according to claim 1, characterized in that said fluid carbon dioxide is in a liquid state.

* * * * *